United States Patent [19]

Kipp

[11] 4,305,715
[45] Dec. 15, 1981

[54] METHOD AND APPARATUS FOR FORMING CAN END

[75] Inventor: Michael A. Kipp, Phoenixville, Pa.

[73] Assignee: Container Corporation of America, Chicago, Ill.

[21] Appl. No.: 123,436

[22] Filed: Feb. 21, 1980

[51] Int. Cl.³ .............................................. B31C 1/08
[52] U.S. Cl. .................................... 493/293; 493/304
[58] Field of Search ............... 493/303, 304, 108, 109, 493/269, 293; 229/5.8, 5.5, 5.6, 48 R

[56] References Cited

U.S. PATENT DOCUMENTS

| | | | |
|---|---|---|---|
| 1,067,493 | 7/1913 | Streit | 493/303 X |
| 1,754,644 | 4/1930 | Moore | 229/48 R X |
| 1,870,977 | 8/1932 | Wilson | 229/48 R X |
| 3,049,979 | 8/1962 | Sayford, Jr. | 493/109 X |
| 3,093,287 | 6/1963 | Stark | 229/48 R X |
| 3,105,421 | 10/1963 | Petri | 493/303 |
| 3,322,318 | 5/1967 | Felton, Jr. et al. | 229/5.6 X |
| 3,583,624 | 6/1971 | Peacock | 493/109 X |
| 4,201,328 | 5/1980 | MacEwen | 493/108 X |

Primary Examiner—James F. Coan
Attorney, Agent, or Firm—R. W. Carpenter; Davis Chin

[57] ABSTRACT

A method and apparatus for forming a smooth surface in the side seam area of the end of a convolute paperboard can body.

2 Claims, 5 Drawing Figures

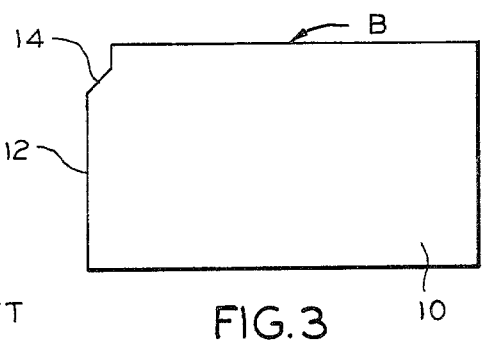
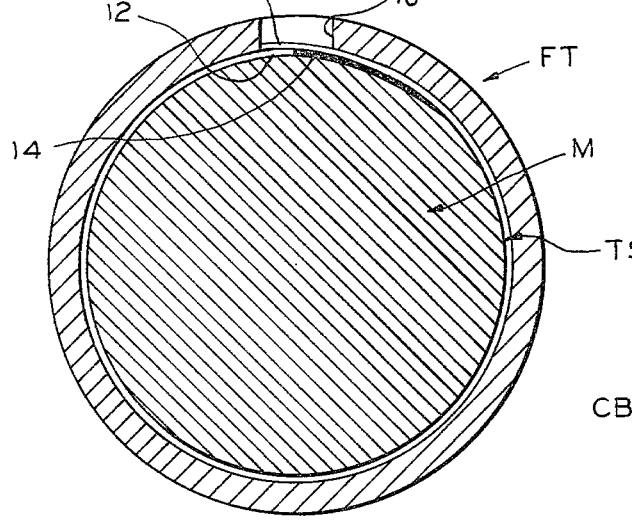
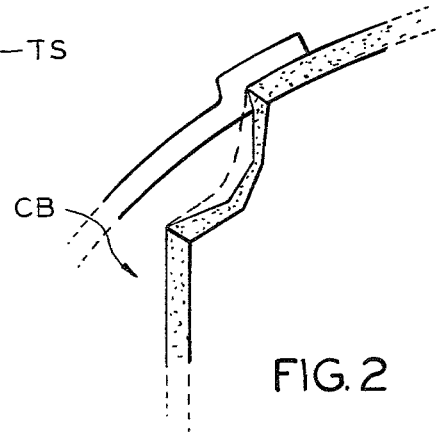
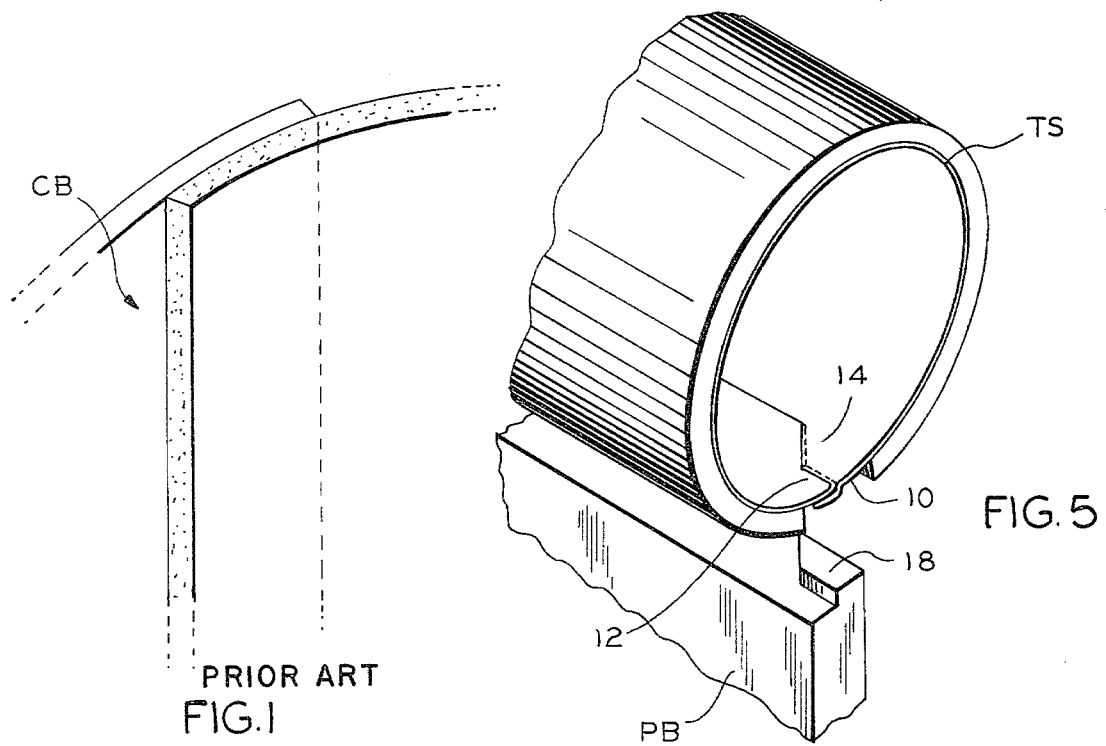

METHOD AND APPARATUS FOR FORMING CAN END

SUMMARY OF THE INVENTION

This invention relates to the formation of convolute can bodies made of paperboard.

It is an object of the invention to provide a method and apparatus for forming a smooth inner surface in the area of the side seam of a can body to insure a snug fit with a plug type closure.

A more specific object of the invention is the provision of a method and apparatus for compressing one corner of a can body edge into the recessed portion of another corner in the area of the side seam.

These and other objects of the invention will be apparent from an examination of the following description and drawings.

THE DRAWINGS

FIG. 1 is a fragmentary perspective view of one end of a conventional convolute can body formed from a generally rectangular blank having overlapping side edges;

FIG. 2 is a view similar to FIG. 1 but illustrating a can body formed by the method and apparatus of the present invention;

FIG. 3 is a plan view, reduced in size, of a blank of sheet material from which the can body illustrated in the previous views may be formed;

FIG. 4 is a fragmentary, transverse section illustrating the manner in which the can body of the present invention is formed;

FIG. 5 is a fragmentary perspective view of the structure illustrated in FIG. 4.

It will be understood that, for purposes of clarity, certain elements may have been intentionally omitted from certain views where they are believed to be illustrated to better advantage in other views.

DESCRIPTION OF THE INVENTION

Referring now to the drawings for a better understanding of the invention and particularly to FIGS. 1 and 2, it will be seen that if a can body CB is formed in a conventional manner with a side seam of overlapping side edges of the blank, the inner surface will not be smooth and therefore will not provide a snug fit with a plug type closure (not shown).

As best seen in FIG. 2, the invention provides a method and apparatus for forming the end portion of a can in such a manner as to insure a smooth inner surface in the area of the side seam, so that when a plug type closure is inserted in the end of the can body, there will be a snug fit around the entire periphery of the plug and can body.

As best seen in FIG. 3 the can body CB may be formed from a generally rectangular flat blank B of foldable sheet material such as paperboard.

Blank B is a generally rectangular panel having opposed side edges 10 and 12 adapted to be secured together in overlapped relation to form a side seam as illustrated in FIG. 4

One corner of blank B is cut away to provide a recess 14, the purpose of which is described hereinafter.

The initial formation of the blank into a tubular structure TS may be accomplished in the conventional manner such as in a convolute winding mechanism (not shown). After the blank has been formed into a tubular structure TS, it is slipped over a cylindrical mandrel M. The tubular structure TS and mandrel M are then placed within a hollow cylindrical forming tool FT as shown in FIG. 4. Still referring to FIG. 4, the difference in dimension between the outside diameter of the mandrel M and the inside diameter of the forming tool FT is only slightly larger than the thickness of blank B or tubular structure TS. Forming tool FT is provided with an opening 16 in the area of the side seam overlap of the tubular structure, and the size of the opening is slightly larger than the end of pressure bar PB which is adapted to be received within opening 16 to engage the tubular structure TS and exert pressure against the tubular structure and mandrel M.

As best seen in FIGS. 4 and 5, the head 18 of the pressure bar PB is provided with a contour which matches that of recess 14, so that when the pressure bar is moved against the tubular structure and the mandrel, material of the structure in the overlapping edge 10 is forced into the recess 14 of the underlying edge 12 to provide a smooth inner surface, as illustrated in FIG. 2.

I claim:

1. A method of forming, from a generally rectangular blank of paperboard having a recess at one corner thereof, a convolute, cylindrical, can body end portion with a relatively smooth surface at the area of side seam overlap to accommodate a relatively snug fit with a plug type closure, comprising the steps of:
    (a) forming the blank into a tubular structure with the recessed corner of the blank underlying another corner thereof;
    (b) inserting a cylindrical mandrel within said tubular structure;
    (c) inserting said tubular structure and mandrel within a hollow, cylindrical, sleeve shaped forming tool which has an opening at one end adjacent said recessed corner;
    (d) applying pressure against said tubular structure and mandrel, in the area where said corners of the tubular structure overlap, by a pressure bar having a head contour matching the shape of said corner recess to compress material of said other corner into the recess of said one corner.

2. Apparatus for forming, from a tubular structure of paperboard with overlapping side edges one of which is recessed at one corner thereof, a convolute, cylindrical, can body end portion with a relatively smooth surface at the area of side edge overlap to accommodate a relatively snug fit with a plug type closure, comprising:
    (a) a cylindrical mandrel adopted for insertion within said tubular structure;
    (b) a hollow, cylindrical, sleeve shaped forming tool for receiving said mandrel and said tubular structure and having an opening at one end thereof adjacent said recessed corner;
    (c) a pressure bar having a head contour matching the shape of said corner recess for applying pressure against said tubular structure and mandrel, in the area where said corners of the tubular structure overlap, to compress material of another corner of said structure into the recess of said one corner.

* * * * *